United States Patent [19]

Suga et al.

[11] Patent Number: 4,824,704
[45] Date of Patent: Apr. 25, 1989

[54] 3-METHYLBUTENE-1 POLYMER COMPOSITION, PROCESS FOR ITS PREPARATION AND CONTAINER MADE THEREOF

[75] Inventors: Yoshinori Suga, Tokyo; Eiji Tanaka, Kawasaki; Nobuo Enokido, Sagamihara; Hidehito Kato; Katsuji Shibata, both of Yokohama, all of Japan

[73] Assignee: Mitsubishi Chemical Industries Limited, Tokyo, Japan

[21] Appl. No.: 173,583

[22] Filed: Mar. 25, 1988

[30] Foreign Application Priority Data

Mar. 26, 1987 [JP] Japan .................................. 62-72083
Sep. 14, 1987 [JP] Japan ................................. 62-230754

[51] Int. Cl.$^4$ ...................... C08L 23/10; C08L 23/20; B65D 1/22; B65D 1/26
[52] U.S. Cl. ................................ 428/36.92; 525/191; 525/240; 525/320; 525/321; 428/35.7
[58] Field of Search ............... 525/191, 240, 320, 321; 428/35

[56] References Cited

U.S. PATENT DOCUMENTS

| | | | |
|---|---|---|---|
| 3,544,662 | 12/1970 | Polestak et al. | 525/240 |
| 3,894,120 | 7/1975 | Frese et al. | 525/191 |
| 4,645,797 | 2/1987 | Suga et al. | 525/191 |

*Primary Examiner*—Carman J. Seccuro
*Attorney, Agent, or Firm*—Oblon, Fisher, Spivak, McClelland & Maier

[57] ABSTRACT

A 3-methylbutene-1 polymer composition comprising:
(a) from 10 to 85% by weight of a 3-methylbutene-1 homopolymer or a copolymer of 3-methylbutene-1 with other α-olefin having from 2 to 18 carbon atoms, which has a heat of fusion of at least 7 cal/g as measured by a differential scanning calorimeter;
(b) from 10 to 85% by weight of a copolymer of 3-methylbutene-1 with other α-olefin having from 2 to 18 carbon atoms, which has a heat of fusion of more than 1 cal/g and less than 7 cal/g as measured by a differential scanning calorimeter; and
(c) from 3 to 40% by weight of an elastomeric copolymer of 3-methylbutene-1 with other α-olefin having from 2 to 18 carbon atoms or an elastomeric copolymer of at least two other olefins having from 2 to 18 carbon atoms, which shows no peak in fusion as measured by a differential scanning calorimeter.

20 Claims, 3 Drawing Sheets

3-METHYLBUTENE-1 POLYMER COMPOSITION, PROCESS FOR ITS PREPARATION AND CONTAINER MADE THEREOF

The present invention relates to a 3-methylbutene-1 polymer composition having excellent heat resistance and stretchability and capable of providing a shaped product having excellent mechanical strength such as tear strength or impact strength, and a process for its preparation and a container made thereof.

In recent years, there has been an increasing demand for resins having excellent heat resistance, machanical strength, electrical properties, chemical resistance, moisture resistance, etc. as various molding materials or as stretched or non-stretched film materials.

3-methylbutene-1 polymers have long been known as crystalline polyolefins having high melting points. For instance, Japanese Unexamined Patent Publications No. 182305/1982, No. 195704/1982 and No. 8708/1983 disclose processes for polymerizing 3-methylbutene-1 by using a titanium trichloride having a small aluminum content and an organoaluminum compound. Further, the present inventors have proposed in Japanese Unexamined Patent Publication No. 7349/1986 a two component composition comprising a polymer having a 3-methylbutene-1 content of more than 90% by weight and a polymer having 3-methylbutene-1 content of from 40 to 90% by weight and a process for its preparation.

The 3-methylbutene-1 polymers obtained by such conventional processes exhibit high melting points. However, they are still inadequate in the mechanical strength such as tear strength or impact strength of their molded products as well as the heat resistance and stretchability represented by their Vicat softening points, particularly in the balance of such physical properties. Therefore, they are not necessarily satisfactory as various molding materials or as stretched or non stretched film materials.

The present inventors have conducted extensive studies to overcome the above-mentioned various drawbacks of 3-methylbuene-1 polymers or to improve the balance of the physical properties such as the heat resistance and stretchability represented by the Vicat softening point and the mechanical strength, and as a result, have arrived at the present invention. Heretofore, such a 3-methylbutene-1 polymer composition and the process for its preparation have not been known.

The present invention provides a 3-methylbutene-1 polymer composition comprising:

(a) from 10 to 85% by weight of a 3-methylbutene-1 homopolymer or a copolymer of 3-methylbutene-1 with other $\alpha$-olefin having from 2 to 18 carbon atoms, which has a heat of fusion of at least 7 cal/g as measured by a differential scanning calorimeter;

(b) from 10 to 85% by weight of a copolymer of 3-methylbutene-1 with other $\alpha$-olefin having from 2 to 18 carbon atoms, which has a heat of fusion of more than 1 cal/g and less than 7 cal/g as measured by a differential scanning calorimeter; and (c) from 3 to 40% by weight of an elastomeric copolymer of 3-methylbutene-1 with other $\alpha$-olefin having from 2 to 18 carbon atoms or an elastomeric copolymer of at least two other olefins having from 2 to 18 carbon atoms, which shows no peak in fusion as measured by a differential scanning calorimeter.

Further, the present invention provides a process for preparing a 3-methylbutene-1 polymer composition, which comprises in the presence of a catalyst composed mainly of a transition metal compound and an organometallic compound of a metal of Group I to Group III of the Periodic Table, (a) a step of polymerizing 3-methylbutene-1, or 3-methylbutene-1 and other $\alpha$-olefin having from 2 to 18 carbon atoms, to form a homopolymer or copolymer having a heat of fusion of at least 7 cal/g as measured by a differential scanning calorimeter in an amount of from 10 to 85% by weight based on the total amount of formed polymers;

(b) a step of copolymerizing 3-methylbutene-1 with other $\alpha$-olefin having from 1 to 18 carbon atoms to form a copolymer having a heat of fusion of more than 1 cal/g and less than 7 cal/g as measured by a differential scanning calorimeter in an amount of from 10 to 85% by weight based on the total amount of formed polymers, in an optional order, and then, (c) polymerizing 3-methylbutene-1 with other $\alpha$-olefin having from 2 to 18 carbon atoms or copolymerizing at least two other $\alpha$-olefins having from 2 to 18 carbon atoms to form an elastomeric copolymer which shows no peak in fusion as measured by a differential scanning calorimeter in an amount of from 3 to 40% by weight based on the total amount of formed polymers.

From the 3-methylbutene-1 polymer composition according to the present invention, films having excellent heat resistance and tear strength can be prepared, and by virtue of its excellent stretchability, stretched films can readily be obtained. Further, it is possible to obtain a shaped product having excellent rigidity, impact resistance and elongation. Such films or shaped products, or laminates have, in addition to such properties, excellent electrical properties, chemical resistance, moisture resistance and transparency, and they are useful for various packaging materials, insulating materials, printed circuit boad materials, magnetic recording base films, heat resistant containers or flat antenna materials.

Now, the present invention will be described in detail with reference to the preferred embodiments.

Figure 1:
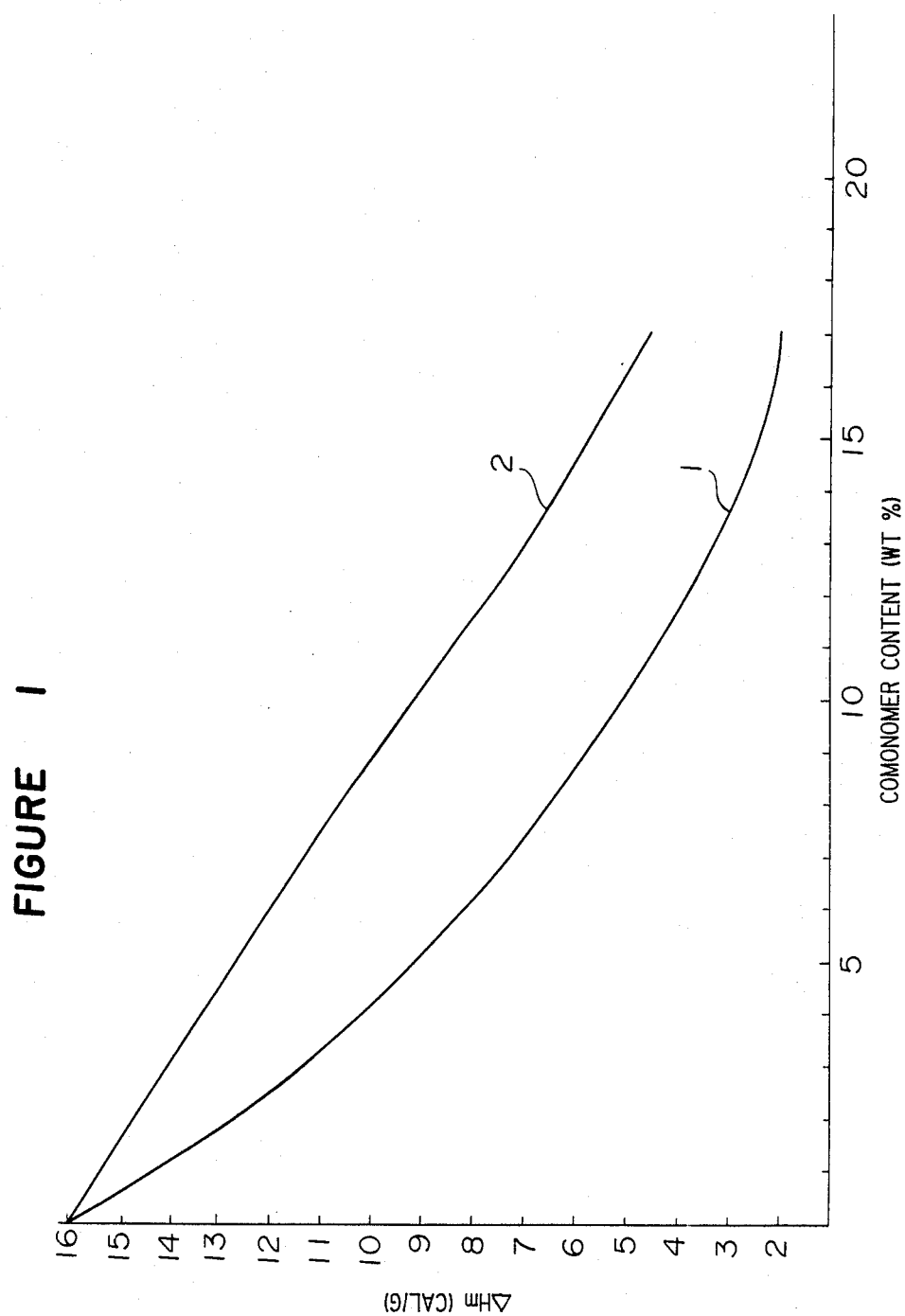
FIG. 1 is a graph showing the relation between the comonomer content and the heat of fusion with respect to a 3-methylbutene-1-octene-1 random copolymer and a 3-methylbutene-1-butene-1 random copolymer.

In the polymer composition of the present invention, the first component (hereinafter referred to as the component (a)) is a homopolymer of 3-methylbutene-1 or a copolymer of 3-methylbutene-1 with other $\alpha$-olefin having from 2 to 18 carbon atoms, which has a heat of fusion of at least 7 cal/g as measured by a differential scanning calorimeter (DSC).

Said other $\alpha$-olefin having from 2 to 18 carbon atoms in the copolymer includes ethylene, propylene, butene, hexene, 4-methylpentene-1, octene, decene, dodecene, tetradecene, styrene and vinyl cyclohexane. These other-$\alpha$-olefins may be used alone or in combination as a mixture of two or more. Further, a polyene such as butadiene or isoprene may be contained in a small amount.

The copolymerization is preferably conducted by so-called random copolymerization.

The 3-methylbutene-1 content in the copolymer varies depending upon the type of the copolymerized other α-olefin, but is usually more than 90% by weight and preferably at least 95% by weight particularly when high heat resistance is required. In such a case, the heat of fusion is at least 9 cal/g. If the heat of fusion is less than 7 cal/g, the crystallinity of the entire composition tends to be inadequate, or the melting point tends to be low, whereby the high heat resistance and solvent resistance as the inherent characteristics of the 3-methylbutene-1 polymer will be lost, such being undesirable.

The proportion of the component (a) in the composition is from 10 to 85% by weight, preferably from 30 to 80% by weight, more preferably from 40 to 70% by weight.

The second component (hereinafter referred to as the component (b)) is a copolymer of 3-methylbutene-1 with other α-olefin having from 2 to 18 carbon atoms, which has a heat of fusion of more than 1 cal/g and less than 7 cal/g as measured by a differential scanning calorimeter (DSC).

Said other α-olefin may suitably be selected from those useful for the component (a). Such other α-olefins may be used alone or in combination as a mixture of two or more. Further, a polyene such as butadiene or isoprene may be contained in a small amount.

The copolymerization is preferably conducted by so-called ramdom copolymerization.

The heat of fusion of the component (b) is more than 1 cal/g and less than 7 cal/g. The corresponding amount of the copolymerized α-olefin may vary depending upon the type of the α-olefin, but it is such an amount that the 3-methylbutene-1 content will be from 60 to 95% by weight, preferably from 60 to 90% by weight. If the heat of fusion exceeds the above range, the effectiveness for the improvement of the stretchability and the impact strength tends to be inadequate, and if it is less than the above range, the heat resistance will be inadequate.

The proportion of the component (b) in the composition is from 10 to 85% by weight, preferably from 15 to 50% by weight, more preferably from 20 to 45% by weight. If the proportion of the component (b) is too small, the improvement of e.g. the stretchability or the impact strength will be inadequate.

The third component (hereinafter referred to as the component (c)) is an elastomeric copolymer of 3-methylbutene-1 with other α-olefin having from 2 to 18 carbon atoms or an elastomeric copolymer of at least two other olefins having from 2 to 18 carbon atoms, which exhibits no peak in fusion as measured by a differential scanning calorimeter.

Said other α-olefins may be selected from those for the componenet (a). Further, a polyene such as butadiene or isoprene may be contained in a small amount.

The copolymerization may be conducted preferably by so-called random copolymerization.

This component (c) may be a copolymer of at least two types of α-olefins other than 3-methylbutene-1, such as ethylene/propylene, ethylene/4-methylpentene-1, propylene/4-methylpentene-1, 4-methylpentene-1/octene-1, 4-methylpetene-1/decene, 4-methylpene-1/dodecene or 4-methylpentene-1/decene/tetradecene, wherein the content of each comonomer is from about 30 to 70% by weight. However, the component (c) is preferably a copolymer of 3-methylbutene-1 with other α-olefin. The 3-methylbutene-1 content in the copolymer is less than 60% by weight, preferably less than 50% by weight, more preferably from 5 to 50% by weight. If the content is outside this range, the improvement of the stretchability or the tear strength or the impact strength of the shaped product tends to be inadequate.

The proportion of the component (c) in the composition is from 3 to 40% by weight, preferably from 3 to 30% by weight, more preferably from 5 to 25% by weight. If the proportion of the component (c) is too small, the improvement of the stretchability or the tear strength tends to be inadequate, and if the proportion is too much, the heat resistance or the solvent resistance tends to be low, such being undesirable.

The crystallinity of the polymer or the amount of the crystalline component in the polymer is reflected on the heat of fusion of the polymer as measured by the differential scanning calorimeter. The heat of fusion of the 3-methylbutene-1 homopolymer is usually at a level of about 16 cal/g, although it may be affected also by the stereoregularity and the molecular weight. In the case of an elastomeric copolymer, no substantial heat of fusion is observed.

In the composition of the present invention, the component (a) is a component responsible for the high heat resistance inherent to the 3-methylbutene-1 polymer, whereas the component (c) is the component responsible for the improvement of the impact resistance and the stretchability. The component (b) is considered to serve as a compatibilizing agent to facilitate the uniform dispersion and pulverization of the component (c) in the component (a). In a usual mixing method, the dispersion of an eleastomeric component in a 3-methylbutene-1 homopolymer is inadequate, whereby no substantial effect for the improvement of the impact strength and the stretchability is observed.

As the amount of the copolymerized α-olefin relative to 3-methylbutene-1 increases, the crystallinity of the copolymer decreases, and the dispersion of the elastomeric component is facilitated, whereby the impact resistance and stretchability will be improved. However, in such a case, the heat resistance of the copolymer decreases, and from the viewpoint of the balance of the heat resistance and the impact resistance and stretchability, the overall improvement is little.

Under the circumstances, a highly crystalline and highly heat resistant component which has essentially poor compatibility with an elastomeric component, has now been combined with an elastomeric component, and a further component having an intermediate crystallinity has been incorporated for compatibilizing the two, whereby a 3-methylbutene-1 polymer composition having an excellent balance between the heat resistance and the impact resistance and stretchability has been obtained. Thus, the present invention has been accomplished.

There is no particular restriction as to the manner for preparing the composition from the components (a), (b) and (c). The respective components may be simply mixed in the form of powders or pellets, or they may be mixed in the form of a suitable solution. Otherwise, they may be kneaded by a single screw or double screw extruder or by a Banbury mixer.

However, it is preferred to employ a three step polymerization. In the three step polymerization, 3-methylbutene-1 or 3-methylbutene-1 and other α-olefin are polymerized in the presence of a transition metal compound and an organometallic compound of a metal of Group I to Group III of the Periodic Table in an aliphatic, alicyclic or aromatic hydrocarbon such as butane, hexane, heptane, cyclohexane or benzene, or in a liquid olefin, or in the absence of any solvent, to form the components (a) and (b), and then the component (c) is formed. Preferably, the component (a) is formed first, then the component (b) is formed and finally the component (c) is formed. This is particularly preferred for preventing the elution of the component (c) to a solvent in the step of removing the catalyst.

There is no particular restriction as to the transition metal compound and the organometallic compound of Group I to Group III of the Periodic Table as the catalyst. Those commonly employed for the polymerization of olefins may be employed. Preferably employed is a combination of a solid catalyst component containing Mg, Ti, halogen and an electron donative compound such as an ether or an ester and an organoaluminum compound, and if necessary, an electron donative compound such as an ether or an ester. Such a solid catalyst component is disclosed in e.g. Japanese Unexamined Patent Publications No. 98076/1977, No. 24378/1978, No. 85877/1978, No. 117083/1978, No. 6204/1984 and No. 11306/1984 and Japanese Patent Application No. 293769/1987. Further, a combination of a solid titanium trichloride catalyst component having an aluminum content of not higher than 0.15 as the atomic ratio of aluminum to titanium and containing a chelating agent and an organoaluminum compound, particularly an aluminum dialkylmonohalide, and if necessary an electron donative compound such as an ether or an ester, may also preferably be employed. Such a solid titanium trichloride chatalyst component is disclosed in e.g. Japanese Examined Patent Publications No. 8451/1980, No. 8452/1980, No. 8003/1980, No. 27871/1979, No. 39165/1980, No. 14054/1980 and No. 44958/1978.

The polymerization temperature is usually from 0° to 150° C. If necessary, a molecular weight controlling agent such as hydrogen may be employed.

The polymer composition thus obtained has a melting point of at least 240° C., preferably at least 260° C.

This polymer composition may be subjected to molding into films or other various shaped products or may be used as a base polymer for grafting reactions, if necessary, after an addition of a stabilizer, an agent for preventing harmful effects of metals, a flame retardant, an inorganic or organic filler, etc.

The 3-methylbutene-1 polymer composition of the present invention is excellent in the heat resistance and stretchability represented by the Vicat softening point and the mechanical strength such as the impact strength and tear strength, and it is particularly suitable for use as a heat resistant container.

Now, the container of the present invention will be described.

In recent years, there has been an increasing demand for ready-made food products to save the time for cooking or to simplify the cooking. Further, use of electronic oven ranges has wide spread in recent years. Reflecting these trends, an attention has been drawn to heat resistant containers which may be used for both electronic ranges and ovens.

Heretofore, foamed polystyrene has been used in many cases for containers for such ready-made food products. However, the softening temperature of polystyrene is low, and its heat resistance is inadequate for use in e.g. electronic ranges or ovens.

As a resin having higher heat resistance than polystyrene, polypropylene may be mentioned. A container made of a polypropylene resin usually has adequate heat resistance when it is heated in an electronic range under such a condition that it contains a food having adequate water content. However, it is not durable in an oven having a temperature of 160° C. or higher or with a food having a substantial fat and oil content.

On the other hand, a thin wall container made of so-called readily crystallizable polyethylene terephthalate (hereinafter referred to simply as C-PET) wherein an additive to accelerate the crystallization rate is added and a polyolefin or the like is blended to increase the impact resistance, has oil resistance as well, and it is practically employed as a container useful for both electronic ranges and ovens.

However, such polyethylene terephthalate containers have the following deficiencies.

Firstly, in many cases, ready-made food products of this type are kept in a refrigerator, and the C-PET containers are deficient in the impact resistance at low temperatures.

With respect to heat resistance, C-PET containers are said to be durable for use at a temperature of from 220° to 230° C. However, when practically used in household electronic oven ranges, C-PET containers are likely to undergo deformation at high temperatures and they are hardly practically useful at such high temperatures. Furthermore, after the cooking under heating, the crystallization proceeds, whereby the impact resistance substantially decreases. Furthermore, as compared with glass containers, C-PET containers are slow in heating its content as heated at the same output, i.e. the utilization efficiency of high frequency is low.

It has been found possible to overcome such deficiencies inherent to the heat resistant containers made of the conventional resins and to provide a heat resistant container having excellent properties by using the 3-methylbutene-1 polymer composition of the present invention.

The container of the present invention is prepared preferably by thermoforming the 3-methylbutene-1 polymer composition. Namely, it is a top-opened container prepared by sheeting the composition and then thermoforming it.

The 3-methylbutene-1 polymer composition of the present invention has a melt index of from 0.1 to 100 g/10 min., preferably from 0.5 to 70 g/10 min., as measured at 320° C. in accordance with ASTM D-1238. If the melt index is higher than the upper limit, the flowability will be good which is advantageous for sheet forming. However, there will be a drawback of the sheet during thermal forming, and the moldability in the thermalforming tends to be inferior. Further, the impact resistance will be low. On the other hand, if the melt index is lower than the lower limit, molding will be impossible, or the productivity will be low, although the impact strength will be high.

The melt index of the 3-methylbutene-1 polymer composition may change during molding. Therefore, in order to obtain good physical properties, the melt index of the shaped product is preferably within the above-mentioned range.

The 3-methylbutene-1 polymer composition of the present invention has a melting point of from 250° to 310° C. as measured by DSC. The melting point is particularly preferably from 270° to 305° C. If the melting point is higher than the upper limit, the molding temperature tends to be too high, and degradation of the polymer during molding is likely to occur. On the other hand, if the melting point is lower than the lower limit, the heat resistance will be inadequate.

Further, the heat of fusion of the 3-methylbutene-1 polymer composition of the present invention is at least 4 cal/g, preferably at least 6 cal/g, as measured by DSC. The heat of fusion being low means that the crystallinity is low, which in turn means low heat resistance, such being undesirable.

The polymer obtained by the three step polymerization is superior to the polymer obtainable by the two step polymerization in the uniform dispersibility of an elastomeric component, whereby superior heat resistance and impact resistance are obtainable at the same time.

This polymer composition is subjected to molding after an addition of a thermal stabilizer and, if necessary, a pigment, etc.

The container of the present invention is to be used at high temperatures. Therefore, selection of the thermal stabilizer is important. Particularly, one which does not scatter at a high temperature is preferred. As such an additive, there may be employed a combination of Irganox 1010 (trade name, manufactured by Nippon Ciba-Geigy Company) and Irgafos P-EPQ (trade name, Nippon Ciba-Geigy Company) and, if necessary, dihydroanthracene, a combination of Irganox 1010 and MARK AO-412S (trade name, manufactured by Adeca Argas Company) and if necessary, Irgafos P-EPQ, or a combination of MARK AO-18 (trade name, Adeca Argas Company), MARK AO-412S (trade name, manufactured by Adeca Argas Company) and if necessary Irgafos P-EPQ. As other additives Rasmit HPM-12 (trade name, manufactured by Daiichi Kogyo Seiyaku K.K.) Irgafos 168 (trade name, manufactured by Nippon Ciba-Geigy Company), MARK AO-20, MARK AO-80, MARK PEP 36 (trade names, manufactured by Adeca Argas Company) and DSTDP are also effective. The thermal stabilizer is used in an amount within a range of from 0.01 to 3 parts by weight, preferably from 0.1 to 1 part by weight relative to 100 parts by weight of the 3-methylbutene-1 polymer composition. As a molding method of the heat resistant container from the 3-methylbutene-1 polymer composition of the present invention, a thermoforming method is preferably employed. The thermoforming method is one of a methods for processing thermoplastic resin sheets, wherein a heated softened sheet is deformed by a certain external force and cooled in such a deformed state, to obtain a shaped product, as disclosed in e.g. "Practical Plastic Terminology Dictionary" (complied by Masaji Seto, Plastics Age, 1975) or working manual "Thermoforming (Vacuum Forming, Pressure Forming)" compiled by Sogo Kagaku Kenkyusho, Kabushiki Kaisha Asano Kenkyusho, edited by Kazuo Asano). It includes ridge molding, matched mold molding, straight molding (vaccum, pressure forming), drape molding, reverse draw molding, air slip molding, plug assist reverse draw molding and contact heating air-pressure molding. Usually it is possible to obtain a molded product having a desired shape by vacuum or pressure forming equipped with a plug assist.

Vacuum and pressure forming will be breifly described. The 3-methylbutene-1 polymer composition is formed into a sheet, then the sheet is heated and softened. The softened sheet is uniformly spread and stretched in a mold by vacuum and/or air-pressure. Then, after crystallization has adequately preceeded in the mold, the shaped product is taken out from the mold. The sheet may be formed by a usual method such as T-die extrusion. The thickness of the sheet is usually from 200 $\mu$m to 2.5 mm, preferably from 300 $\mu$m to 1.5 mm. If the thickness of the sheet exceeds this range, uniform heating of the sheet tends to be difficult, or the progress of crystallization at various portions of the sheet tends to be non-uniform, such being undesirable.

The temperature for heating the sheet is usually from 220° to 310° C., preferably from 250° to 300° C., it is preferably within +20° C. of the melting point of the resin composition and usually most preferably within a range of −5° to 10° C. of the melting point.

Then, it is preferred to apply vacuum or air-pressure for molding when the sheet has become translucent under heating.

If the heating time is long or if the heating temperature is too high, degradation of the resin takes place, and the physical properties tend to be inferior. The heating time is usually within 30 seconds.

The mold temperature may vary depending upon the type of the resin, but it is usually within a range of from 100° to 250° C., preferably from 150° to 220° C. The shaped product is taken out from the mold after the crystallization of the resin has adequately proceeded and the residual stress has decreased. The wall thickness of the molded product is usually within a range of from 100 $\mu$m to 2 mm, preferably from 200 $\mu$m to 1 mm. If the molding temperature is too low, a molding stress will remain, and the thermal deformation temperature tends to be low, thus leading to a problem for practical use of the product.

The 3-methylbutene-1 polymer composition of the present invention is quick in its crystallization, and the retention time in the mold may be usually as short as from 2 to 5 seconds. Accordingly, it is possible to conduct the molding operation in a very short cycle.

Further, the 3-methylbutene-1 polymer composition of the present invention has good releasability and can easily be taken out from the mold after the molding, whereby the defective product ratio is advantageously small. With respect to the cooling of the container after being taken out from the mold, it is possible to employ a cooling mold, if necessary.

The container as the shaped product of the present invention is a top-opened container. The top-opened container is meant for a dimensionally self-sustaining container with its top opened, such as a tray, a dish, a cup or a box, or such a container having a partition provided therein. For the purpose of the present invention, the top-opened container does not include a soft container such as a bag.

The container made of the 3-methylbutene-1 polymer composition of the present invention has high heat resistance and does not undergo deformation such as twist or warpage even when held in an ambient temperature of 160° C. in which polypropylene undergoes deformation, and it is free from a yellowing problem. Further, by selecting a suitable polymer and molding conditions, it is possible to obtain a container which is free from such problems as deformation or color change even under a high temperature condition of a level of 200° C. or higher and which has heat resistance even at a level of 240° C. or higher. Further, as compared with C-PET, the decrease in the impact strength after heating is small and the product of the present invention can be regarded as being heat resistant also in this sense.

Further, the impact strength is high particularly at low temperatures, and the dart-drop impact strength at −20° C. is as high as 10 kg.cm/cm or higher. With a commercially available C-PET product, the difference in the impact strength as between at 30° C. and at −20° C. is so large that the impact strength at −20° C. is 1/20 of the impact strength at 30° C. Whereas, with the container of the present invention, such a difference is at a level of from ½ to 1/5, and thus the decrease in the impact strength at low temperatures from the level at room temperature is small.

The top-opened container made of the 3-methylbutene-1 polymer resin of the present invention has high heat resistance as a container useful for both an oven and an electronic range, and it is durable for use at a high temperature of 160° C. or even at 200° C., or it is still useful even at a temperature of 240° C. or higher.

When heated by an electronic range, the high frequency absorption or reflection is low as compared with a C-PET container, whereby the heating efficiency of food products in the container is good, and the temperature of the food products can be raised in a short period of time, or the temperature of food products can be raised with a low degree of power consumption.

In most cases, food products to be heat-treated by an electronic range or oven are stored or transported under cooling as contained in containers. The container made of the 3-methylbutene-1 polymer composition of the present invention is far superior to a C-PET container in the impact resistance at such cooling or freezing temperatures. Accordingly, it has an important merit that the container is less susceptible to breakage during the stroage under cooling or freezing.

From the molding aspect, the crystallization is quick, and the releasability from the mold is good, whereby it is possible to shorten the molding cycle and to produce the container at a high production efficiency.

Now, the present invention will be described in detail with reference to Examples. However, it should be understood that the present invention is by no means restricted by these specific Examples.

The physical properties in these Examples were measured in accordance with the following methods.

The following physical properties were measured in accordance with the following methods:

| | |
|---|---|
| Tensile test: | ASTM D 638 |
| Vicat softening point: | ASTM D 1525 |
| Melt index (MI): | ASTM D 1238 (320° C., 2.16 kg) |
| Elemendorf tearing test: | JIS P 8116 |

The melting point and the heat of fusion of each copolymer were measured by a differential scanning calorimeter (DSC) Model 9,900 manufactured by Dupont Company. The fusion curve was obtained with respect to a sample which was once melted in the DSC apparatus and then gradually cooled.

A peak top was taken as the melting point. In a case where a sample exhibited two or more peak tops, each peak top was regarded as a melting point. In principle, the heat of fusion was obtained by drawing a tangent line across the skirts of a peak and determining the heat of fusion from the area defined by the fusion curve and the tangent line.

In Table 1, the heat of fusion of the polymer in the first step is the actually measured value. Whereas, the heat of fusion of the polymer in the second step was obtained from the relation of the copolymer component content and the heat of fusion in FIG. 1 based on the actually measured value of the copolymer component.

The content of each component of the copolymer was obtained by measuring the $^{13}C$ high resolution NMR spectrum at 310° C. by a NMR apparatus Model FX 200 manufactured by Nippon Denshi (equipped with a high temperature temperature-valuable device).

The vacuum and air-pressure forming was conducted by means of a vacuum and air-pressure forming machine (equipped with a plug assist) manufactured by Kabushiki Kaisha Asano Kenkyusho. The molding conditions such as the molding temperature and the mold temperature were shown in Table 2 together with the results of the evaluation of the physical properties. With respect to a resin composition having two or more melting points, the average value was obtained, and the molding temperature was determined based on the average value.

The shape of the mold was a box type container of 15 cm × 12.5 cm × depth of 2.5 cm.

Measurement of heat resistance (oven test)

(1) By using an electronic oven range Model RO-1900 manufactured by Mitsubishi Denki Kabushiki Kaisha, a sample was heated from room temperature with a preliminarily set temperature of 250° C., and the time until deformation started by heating was measured.

(2) A molded product was placed in a gear oven set at a temperature of 200° C., 230° C. or 240° C. 15 minutes later, it was taken out, and the outer appearance was examined. (The gear oven used was Tabai.gear oven Model GPS-112.)

Measurement of the heating rate of the content by an electronic range 100 cc of salad oil was put in a molded container, and the internal temperature was measured as time passed to determine the efficiency for heating the content. (The electronic range used was the electronic oven range Model RO-1900 manufactured by Mitsubishi Denki Kabushiki Kaisha.)

Dart-drop impact strength

A sample of the 3-methylbutene-1 polymer composition used for the measurement was pressed into a sheet of about 600 μm, then vacuum-formed and heat-treated at 200° C. for one hour to have a thickness of about 400 μm. While a commercially available C-PET container was used as it is for the measurement. The measuring apparatus was a drop tester manufactured by Rheometric Company. The measurement was conducted with a dropping height of 50.292 cm, a weight of the dart-drop of 3.6197 kg and a dropping speed of 3.3337 m/s. The measurement was conducted at temperatures of 30° C. and −20° C.

The measurement at the low temperature was conducted after cooling with liquid nitrogen to bring the temperature of the chamber for the measurement to the prescribed temperature. The measured value was represented by dividing the energy required for rupture by the thickness of the test piece.

The test piece was cut out from the bottom of a container, and fixed to a clamp having an inner diameter of 1.5 inch and subjected to the measurement.

Catalyst Preparation Example

Into an autoclave of a capacity of 1 liter thoroughly flashed with nitrogen at room temperature, 515 ml of purified toluene was introduced, and 65.1 g (0.5 mol) of n-butyl ether, 94.9 g (0.5 mol) of titanium tetrachloride and 28.6 g (0.24 mol) of diethylaluminum chloride were added thereto under stirring to obtain a brown uniform solution. Then, the solution was heated to 30° C. Upon expiration of 30 minutes, the mixture was heated to 40° C., and maintained at 40° C. for two hours. Then, 32 g (0.17 mol) of titanium tetrachloride and 15.5 g (0.058 mol) of tridecyl methacrylate were added thereto. The mixture was heated to 98° C. and maintained at 98° C. for two hours. Then, particulate purple solid was separated and washed with toluene to obtain solid titanium trichloride.

EXAMPLE 1

Into an induction stirring type autoclave of a capacity of 5 liter thoroughly dried and flashed with argon, 10.0 mol of diethylaluminum monochloride and 3,000 ml of 3-methylbutene-1 were charged. The internal temperature was raised to 80° C., and then 3,078 mg of the solid titanium trichloride catalyst component obtained in the Catalyst Preparation Example was injected with argon gas to initiate the polymerization of the first step. At the same time, copolymerization of 3-methylbutene-1 with octene-1 was conducted at 80° C. for 90 minutes while supplying continuously octene-1 and hydrogen. The total amount of octene-1 supplied in the first step was 27 g, and the total amount of hydrogen was 12.1 mol.

Then, the supply of hydrogen was stopped, and at the same time, the supply of octene-1 was increased and copolymerization of 3-methylbutene-1 of the second step was conducted at 80° C. for 42 minutes. The total amount of the octene-1 supplied in the second step was 49.3 g.

Then, the temperature was immediately lowered to 40° C., and at the same time, 610 ml of octene-1 and 310 ml of 4-methylpentene-1 were injected with argon, and polymerization in the third step was conducted at 40° C. for 45 minutes.

Then, 300 ml of isobutanol was injected with argon to terminate the polymerization. At the same time, unreacted monomers were discharged, and 1,800 ml of n-hexane was charged and stirred at 40° C. for 60 minutes. Then, the mixture was cooled to room temperature, and the supernatant was withdrawn. This operation was repeated 6 times to wash and remove the catalyst component in the polymer. Then, the polymer was dried to obtain 837 g of a 3-methylbutene-1 polymer composition as white powder.

At the completion of the first, second and third steps, small amounts of the respective polymers were sampled and subjected to catalytic analyses, whereby the proportions of the respective components were found, to be as follows:

Namely, the polymer of the first step (component (a)) was 57% by weight; the content of octene-1 in the component (a) was 4.6% by weight; the polymer in the second step (component (b)) was 26% by weight; the content of octene-1 in the component (b) was 15% by weight; the polymer in the third step (component (c)) was 17% by weight; the content of octene-1 in the component (c) was 80% by weight; and the content of 4-methylpentene-1 in the component (c) was 11% by weight.

Further, a non-crystalline and low molecular weight component soluble in n-hexane in the washing step of the catalyst component (hereinafter referred to as a n-hexane soluble component) was 3.8% by weight.

To the obtained polymer composition, Irganox 1010, Irgafos P-EPQ (both manufactured by Nippon Ciba-Geigy Company) and dihydroanthracene were added each in an amount of 0.2 part, and the mixture was pelletized at 320° C. by an extruder.

The melting point of the pellets was 290° C., and the melt index (hereinafter referred to simply as MI) was 0.9 g/10 min. From the pellets, a press sheet was formed and annealed at 200° C. for one hour, and then subjected to the tensile test, the Elemendorf tearing test and the measurement of the Vicat softening point. The results of the polymerization are shown in Table 1, and the results of the various tests are shown in Table 2.

EXAMPLES 2 to 5

The operation was conducted in the same manner as in Example 1 except that the proportions of the components (a), (b) and (c) and the comonomer contents in Example 1 were changed as shown in Table 1.

The results of the polymerization are shown in Table 1, and the results of various tests are shown in Table 2.

COMPARATIVE EXAMPLES 1 and 2

Into an induction stirring type autoclave of a capacity of 2 liter throughly dried and flashed with argon, 2.48 mol of diethylaluminum monochloride and 600 ml of 3-methylbutene-1 were charged. The internal temperature was raised to 80° C., and then, 792 mg of the solid titanium trichloride catalyst component obtained in the Catalyst Preparation Example was injected with argon gas to initiate the polymerization.

At the same time, copolymerization of 3-methylbutene-1 with octene-1 was conducted at 80° C. for 120 minutes while continuously supplying octene-1 and hydrogen.

The total amount of octene-1 supplied was 8.6 g in Comparative Example 1 and 16.5 g in Comparative Example 2. The total amount of hydrogen was 3.5 mol in Comparative Example 1 and 2.6 mol in Comparative Example 2.

Then, 80 ml of isobutanol was injected with argon to terminate the polymerization, and unreacted monomers were discharged. Then, 800 ml of n-hexane was charged and stirred at 60° C. for 60 minutes. Then, the mixture was cooled to room temperature, and the supernatant was withdrawn. This operation was repeated five times to wash and remove the catalyst component in the polymer. Then, the polymer was dried to obtain 142 g (Comparative Example 1) or 154 g (Comparative Example 2) of a 3-methylbutene-1 copolymer as white powder. The results of the polymerization are shown in Table 1.

After an addition of a stabilizer, the mixture was tested in the same manner as in Example 1, and the test results are shown in Table 2.

COMPARATIVE EXAMPLES 3 and 4

The operation was conducted in the same manner as in Example 1 except that the copolymerization of 3-methylbutene-1 with octene-1 in the second step was omitted and the proportions of the components (a) and (c) and the comonomer contents were changed as shown in Table 1.

The results are shown in Tables 1 and 2.

FIG. 1 is a graph showing the relation between the comonomer content and the heat of fusion with respect to the 3-methylbutene-1-octene-1 random copolymer and the 3-methylbutene-1-butene-1 random copolymer.

Namely, line 1 is for the 3-methylbutene-1-octene-1 random copolymer, and line 2 is for the 3-methylbutene-1-butene-1 random copolymer.

Figure 2:
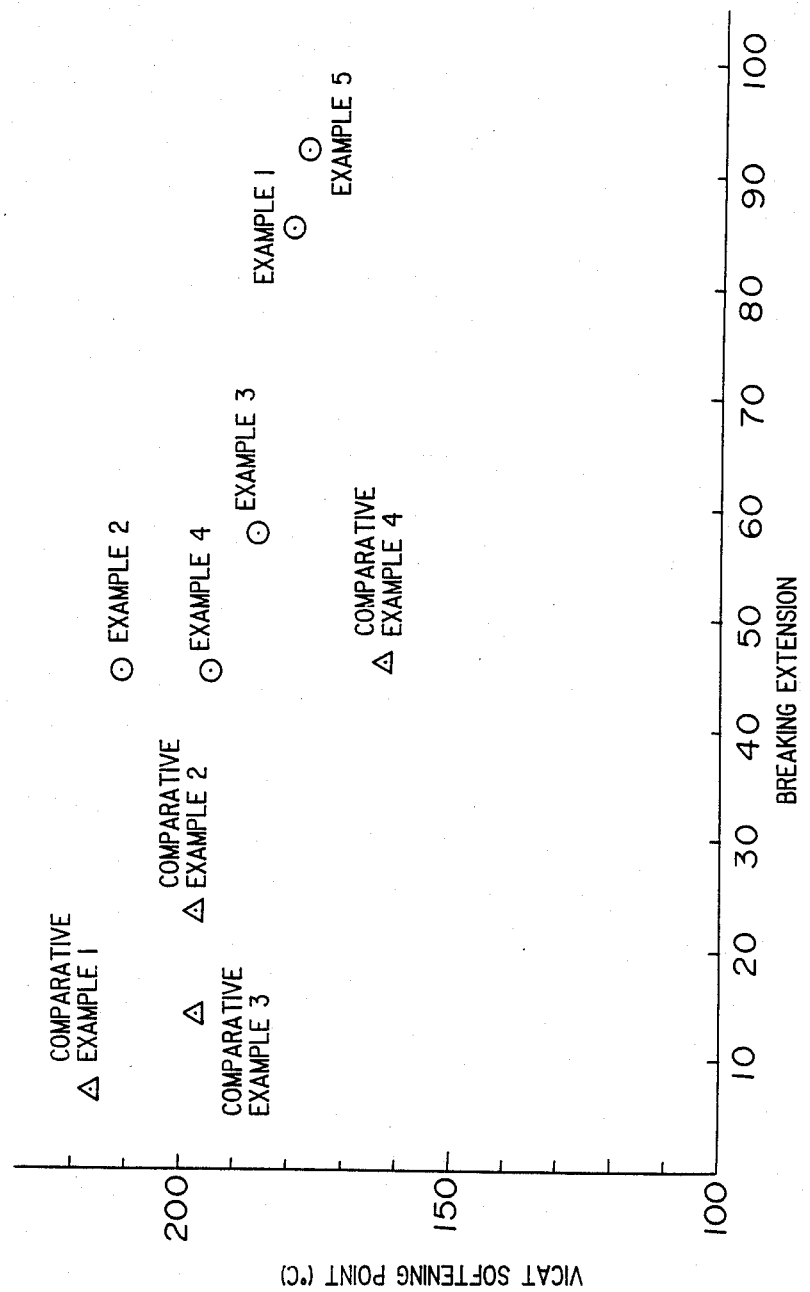
FIG. 2 shows the relation between the Vicat softening point and the breaking extension.

FIG. 2 shows the relation between the Vicat softening point and the breaking extension.

TABLE 1

| | Polymer of 1st step (Component (a)) | | | | |
|---|---|---|---|---|---|
| | Content (wt %) | Polymerization time (hr) | Comonomer Type | Content (wt %) | ΔHm (cal/g) |
| Example 1 | 57 | 1.5 | Octene-1 | 4.6 | 9.5 |
| Example 2 | 50 | 1.2 | " | 0.9 | 14 |
| Example 3 | 42 | 1.0 | " | 1.2 | 14 |
| Example 4 | 61 | 1.5 | " | 3.3 | 11 |
| Example 5 | 55 | 1.5 | Butene-1 | 7.1 | 11 |
| Comparative Example 1 | 100 | 2.0 | Octene-1 | 4.8 | 9 |
| Comparative Example 2 | 100 | 2.0 | " | 8.6 | 6 |
| Comparative Example 3 | 90 | 2.0 | " | 0.8 | 14.5 |
| Comparative Example 4 | 83 | 2.0 | " | 4.0 | 10 |

| | Polymer of 2nd step (Component (b)) | | | | |
|---|---|---|---|---|---|
| | Content (wt %) | Polymerization time (hr) | Comonomer Type | Content (wt %) | ΔHm (cal/g) |
| Example 1 | 26 | 0.7 | Octene-1 | 15 | 2.5 |
| Example 2 | 42 | 1.0 | " | 14 | 3 |
| Example 3 | 42 | 1.0 | " | 8.7 | 6 |
| Example 4 | 29 | 0.7 | " | 14 | 2.5 |
| Example 5 | 27 | 0.7 | " | 17 | 2 |
| Comparative Example 1 | — | — | — | — | — |
| Comparative Example 2 | — | — | — | — | — |
| Comparative Example 3 | — | — | — | — | — |
| Comparative Example 4 | — | — | — | — | — |

| | Polymer of 3rd step (Component (c)) | | | |
|---|---|---|---|---|
| | Content (wt %) | Polymerization time (hr) | Comonomer Type | Content (wt %) |
| Example 1 | 17 | 0.75 | Octene-1 | 80 |
| | | | 4-Methylpentene-1 | 11 |
| Example 2 | 8 | 0.5 | Octene-1 | 40 |
| | | | 4-Methylpentene-1 | 30 |
| Example 3 | 16 | 1.0 | Octene-1 | 40 |
| | | | 4-Methylpentene-1 | 30 |
| Example 4 | 10 | 0.5 | Octene-1 | 80 |
| | | | 4-Methylpentene-1 | 11 |
| Example 5 | 18 | 1.33 | Octene-1 | 84 |
| Comparative Example 1 | — | — | — | — |
| Comparative Example 2 | — | — | — | — |
| Comparative Example 3 | 10 | 1.25 | Octene-1 | 40 |
| | | | 4-Methylpenten-1 | 30 |
| Comparative Example 4 | 17 | 2.0 | Octene-1 | 80 |
| | | | 4-Methylpenten-1 | 11 |

TABLE 2

| | MI (320° C.) (g/10 min) | Melting point (°C.) | Vicat softening point (°C.) | Tensile modulus of elasticity (kg/cm²) | Tensile stress at yield (kg/cm²) | Breaking extension (%) | Elemendorf tearing strength (kg · cm/cm²) | Dart drop impact strength (kg · cm/cm) | n-Hexane soluble component (wt %) |
|---|---|---|---|---|---|---|---|---|---|
| Example 1 | 0.9 | 290 | 180 | 14,500 | 287 | 85 | — | 240 | 3.8 |
| Example 2 | 1.4 | 300 | 211 | 17,200 | 319 | 45 | 19 | — | 1.6 |
| Example 3 | 1.4 | 295 | 186 | 14,200 | 254 | 55 | 26 | — | 4.4 |
| Example 4 | 1.1 | 296 291 | 194 | 17,200 | 327 | 45 | 31 | 317 | 2.2 |
| Example 5 | 1.4 | 284 | 177 | 13,900 | 255 | 92 | 33 | 335 | 5.7 |
| Comparative Example 1 | 4.0 | 297 | 216 | 19,200 | 368 | 7 | 10 | 45 | 4.9 |
| Comparative Example 2 | 2.3 | 290 | 197 | 15,500 | 352 | 23 | 13 | 50 | 5.6 |
| Comparative Example 3 | 4.2 | 301 | 197 | 19,900 | 257 | 14 | 17 | — | 8.8 |
| Comparative Example 4 | 2.9 | 293 287 | 162 | 13,400 | 238 | 46 | 25 | — | 16.9 |

Polymer Preparation Example 1

Into an induction stirring type autoclave of a capacity of 5 liter throughly dried and flashed with argon, 11.2 mol of diethylaluminum monochloride and 3,000 ml of 3-methylbutene-1 were charged. The internal temperature was raised to 80° C., and then, 3,078 mg of the solid titanium trichloride catalyst component obtained in the Catalyst Preparation Example was injected with argon gas to initiate the polymerization in the first step and copolymerization of 3-methylbutene-1 with octene-1 was conducted at 80° C. for 90 minutes, while continuously supplying octene-1 and hydrogen. The total amount of octene-1 supplied in the first step was 19.3 g, and the total amount of hydrogen was 12.1 mol.

Then, the supply of hydrogen was stopped, and at the same time, the supply of octene-1 was increased. The copolymerization of 3-methylbutene-1 in the second step was conducted at 80° C. for 42 minutes. The total amount of octene-1 supplied in the second step was 49.3 g.

Then, the temperature was immediately lowered to 40°, and at the same time, 575 ml of octene-1 and 322 ml of 4-methylpentene-1 were injected with argon, whereby the polymerization in the third step was conducted at 40° C. for 30 minutes.

Then, 200 ml of isobutanol was injected with argon to terminate the polymerization, and at the same time unreacted monomers were discharged. Then, 2,000 ml of n-hexane was charged and stirred at 40° C. for 60 minutes. Then, the mixture was cooled to room temperature, and the surpernatant was withdrawn. This operation was repeated 6 times to wash and remove the catalyst component in the polymer. The polymer was dried to obtain 793 g of a 3-methylbutene-1 polymer composition as white powder.

At the completion of the first, second and third steps, small amounts of the respective polymers were sampled and subjected to catalytic analyses, and the proportions of the respective components were found to be as follows. Namely, the polymer in the first step (component (a)) was 60% by weight the content of octene-1 in the component (a)) was 3% by weight; the heat of fusion of the component (a) was 11 cal/g; the polymer in the second step (component (b)) was 30% by weight; the content of octene-1 in the component (b) was 17% by weight; the heat of fusion of the component (b) was 2 cal/g; the polymer in the third step (component (c)) was 10% by weight; the content of octene-1 in the component (c) was 40% by weight; and the content of 4-methylpentene-1 in the component (c) was 30% by weight.

The non-crystalline and low molecular weight component soluble in n-hexane in the washing step of the catalyst component (hereinafter referred to as a n-hexane soluble component) was 1.9% by weight.

To 100 parts by weight of the polymer composition thus obtained, 0.25 part of MARK AO-18 and 0.25 part of MARK AO-412 S (trade names; both manufactured by Adeca Argas Company) and 0.2 part of Irgafos P-EPQ (trade name; manufactured by Nippon Ciba-Geigy Company) were added, and the mixture was pelletized at 320° C. by an extruder.

The melting points of the pellets were 294° and 289° C., and the melt index (hereinafter referred to MI) was 0.99 g/10 min. The pellets were formed into a sheet having a thickness of 600 μm and subjected to vacuum and air-pressure forming.

The results of the polymerization are shown in Table 3.

Polymer Preparation Examples 2 to 5

The operation was conducted in the same manner as in Polymer Preparation Example 1 except that the proportions of the components (a), (b) and (c) and the contents and the types of comonomers were changed as shown in Table 3. The results of the polymerization are shown in Table 3. However, in Polymer Preparation Examples 3 and 4, the thermal stabilizer was composed of Irganox 1010, Irgafos P-EPQ (trade names; both manufactured by Nippon Ciba-Geigy Company) and dihydroanthracene each in an amount of 0.2 part.

Polymer Preparation Example 6 (Comparative Example)

Into an induction stirring type autoclave of a capacity of 5 liter throughly dried and flashed with argon, 39 mol of diethylaluminum monochloride, 3,500 ml of 3-methylbutene-1 and 103 ml of butene-1 were charged. The internal temperature was raised to 80° C., and then 3,000 mg of the solid titanium trichloride catalyst component obtained in the Catalyst Preparation Example was injected with argon gas to initiate the polymerization.

Copolymerization of 3-methylbutene-1 with butene-1 was conducted at 80° C. for 180 minutes while continuously supplying 195 ml of butene-1. The total amount of the butene-1 supplied was 298 ml.

Then, 200 ml of isobutanol was injected with argon to terminate the polymerization, and at the same time, unreacted monomers were discharged. Then, 200 ml of n-hexane was charged and stirred at 60° C. for 60 minutes. Then, the mixture was cooled to room temperature, and the supernatant was withdrawn. This operation was repeated five times to wash and remove the catalyst component in the polymer. Then, the polymer was dried to obtain 945 g of a 3-methylbutene-1 copolymer as white powder. The additive was the same as in Polymer Preparation Examples 3 and 4. The results are shown in Table 3.

EXAMPLE 6

The sheet of 600 μm in thickness obtained in Polymer Preparation Example 1 was subjected to vacuum and air-pressure forming by a vacuum and air-pressure forming machine manufactured by Asano Kenkyusho.

The temperature of both the upper and lower heaters was 600° C. When the surface temperature of the resin reached 295° C. by heating, the heaters were moved away by automatic control, and a mold was set instead, whereby the vacuum and air-pressure forming was conducted. The mold temperature was set at 190° C., and the retension time was set to be 5 seconds. After 5 seconds, the mold was opened and at the same time pressurized air was jetted from below, whereby the molded resin was released from the mold. The releasability was excellent.

The molded product was trimmed and then subjected to the heat resistance test and the impact resistant test. In the heat resistance test, the molded product was placed in a gear oven of 200° C., 230° C. or 240° C., and 15 minutes later, it was taken out, and the deformation on outer appearance of the molded product was examined.

No deformation was observed at such temperature levels.

The dart-drop impact strength at 30° C. and −20° C. was 170 and 95 kg.cm/cm, respectively, at a thickness of about 400 μm. The results of the evaluation of the physical properties are shown in Table 4.

EXAMPLE 7

The sheet of 600 μm in thickness obtained in Polymer Preparation Example 2 was subjected to molding in the same manner as in Example 6.

However, the resin surface temperature during the molding was set at a level of 285° C., and the mold temperature was set at a level of 190° C. The retension time in the mold was 4 seconds.

For the evaluation of the heat resistance, measurement of the deformation time in an electronic oven range was added. The results of the evaluation of the physical properties are shown in Table 4.

EXAMPLES 8, 9 and 10

The molding was conducted with respect to the polymer compositions obtained in Polymer Preparation Examples 3, 4 and 5. The resin surface temperature, the mold temperature, the retension time in the mold, the results of the appearance tests in a gear oven and the impact strength are shown in Table 4.

COMPARATIVE EXAMPLE 5

A commercically available C-PET container (Pet Coocker manufactured by RISUPACK K.K.) was heated in a gear oven of 200° C., 230° C. or 240° C. for 15 minutes and then withdrawn, and the outer appearance was examined. With respect to the tests at 200° C. and 230° C., no change was observed on the outer appearance, but at 240° C., a deformation due to the shrinkage under heating and softening were observed. The results are shown in Table 4.

COMPARATIVE EXAMPLE 6

A commercially available C-PET container (Pet Coocker manufactured by RISUPACK K.K.) was placed in an electronic oven range and heated by setting the oven temperature to a level of 250° C., whereby the time until deformation started was measured.

The deformation starting time was 9.0 minutes. The results are shown in Table 4.

COMPARATIVE EXAMPLE 7

A commercially available C-PET container (Pet Coocker, manufactured by RISUPACK K.K.) was tested for impact strength at 30° C. and −20° C. The impact strength at −20° C. was particularly low at a level of 4 kg.cm/cm. The results are shown in Table 4.

COMPARATIVE EXAMPLE 8

Molding was conducted with respect to the polymer obtained in Polymer Preparation Example 6. A sheet of 500 μm in thickness prepared from this polymer was molded at a molding temperature of 275° C. at a mold temperature of 160° C. for a retension time of 5 seconds.

The molded product was left to stand for 15 minutes in a gear oven of 200° C., whereby deformation occured.

Further, it was heated from room temperature by setting the temperature of an electronic oven range at a level of 250° C., whereby deformation occured upon expiration of 9 minutes under heating.

The low temperature impact strength was 9 kg.cm/cm, which was higher than C-PET, but lower than the 3-methylbutene-1 polymer composition of the present invention which contains an elastomeric copolymer.

EXAMPLE 11 and COMPARATIVE EXAMPLE 9

100 cc of salad oil was put in the molded product of Example 6 and heated in an electronic range at a power of 500 W (Example 11).

100 cc of salad oil was likewise put in a commercially available C-PET container having the same shape (Pet Coocker, manufactured by RISUPACK K.K.) and then, heated in the same manner as above (Comparative Example 9).

Figure 3:
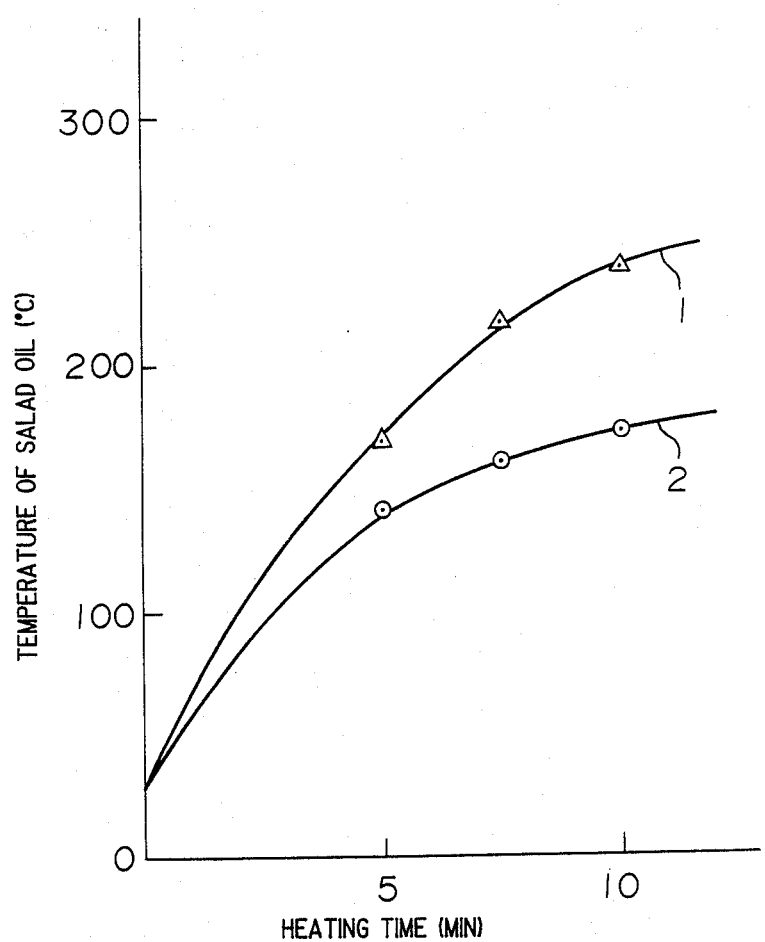
FIG. 3 is a graph showing the relation between the heating time and the temperature of salad oil with respect to Example 11 and Comparative Example 9.

The relation between the heating time and the temperature of salad oil is shown in FIG. 3.

As is evident from the Figure, the container made of the 3-methylbutene-1 polymer composition of the present invention is excellent in the efficiency for utilization high frequency and its content is efficiently heated as compared with the C-PET container.

FIG. 3 is a graph showing the relation between the heating time and the temperature of salad oil with respect to Exampel 11 and comparative Example 9.

In the Figure, the reference numeral 1 represents Example 11 i.e. the results in the case where the container made of the 3-methylbutene-1 polymer composition of the present invention was used.

In the Figure, reference numeral 2 represents Comparative Example 9 i.e. the results in the case where the commercially available C-PET container was used.

TABLE 3

| | Polymer of 1st step (Component (a)) | | | | |
|---|---|---|---|---|---|
| | | Polymeri- | Comonomer | | ΔHm |
| | Content (wt %) | zation time (hr) | Type | Content (wt %) | (cal/g) |
| Polymer preparation Example 1 | 60 | 1.5 | Octene-1 | 3 | 11 |
| Polymer preparation Example 2 | 63 | 1.5 | Butene-1 | 6 | 12 |
| Polymer preparation Example 3 | 54 | 1.5 | Octene-1 | 5 | 9 |
| Polymer preparation Example 4 | 71 | 1.7 | Octene-1 | 5 | 9 |
| Polymer preparation Example 5 | 55 | 1.5 | Butene-1 | 7 | 11 |
| Polymer preparation Example 6 (Comparative) | 100 | 3.0 | Butene-1 | 12 | 7.5 |

| | Polymer of 2nd step (Component (b)) | | | | |
|---|---|---|---|---|---|
| | | Polymeri- | Comonomer | | ΔHM |
| | Content (wt %) | zation time (hr) | Type | Content (wt %) | (cal/g) |
| Polymer preparation Example 1 | 30 | 0.7 | Octene-1 | 17 | 2 |
| Polymer preparation Example 2 | 29 | 0.7 | " | 17 | 2 |
| Polymer preparation Example 3 | 25 | 0.7 | " | 17 | 2 |
| Polymer preparation Example 4 | 21 | 0.5 | " | 16 | 2 |
| Polymer preparation Example 5 | 27 | 0.7 | " | 17 | 2 |
| Polymer preparation Example 6 (Comparative) | — | — | — | — | — |

| | Polymer of 3rd step (Component (c)) | | | |
|---|---|---|---|---|
| | | Polymeri- | Comonomer | |
| | Content (wt %) | zation time (hr) | Type | Content (wt %) |
| Polymer preparation Example 1 | 10 | 0.5 | Octene-1 | 40 |
| | | | 4-Methyl-pentene-1 | 30 |
| Polymer preparation Example 2 | 9 | 0.5 | Octene-1 | 40 |
| | | | 4-Methyl-pentene-1 | 30 |
| Polymer preparation Example 3 | 20 | 0.75 | Octene-1 | 40 |
| | | | 4-Methyl-pentene-1 | 30 |
| Polymer preparation Example 4 | 9 | 0.5 | Octene-1 | 40 |
| | | | 4-Methyl-pentene-1 | 30 |
| Polymer preparation Example 5 | 18 | 1.3 | Octene-1 | 84 |
| Polymer preparation Example 6 (Comparative) | — | — | — | — |

| | MI (g/10 min) | Melting point (°C.) | Heat of fusion (cal/g) |
|---|---|---|---|
| Polymer preparation | 0.99 | 294 | 11.0 |

TABLE 3-continued

| | | | |
|---|---|---|---|
| Example 1 Polymer preparation | 0.73 | 289 283 | 10.0 |
| Example 2 Polymer preparation | 1.38 | 294 | 9.6 |
| Example 3 Polymer preparation | 1.30 | 287 294 | 8.6 |
| Example 4 Polymer preparation | 1.4 | 289 284 | 8.9 |
| Example 5 Polymer preparation | 0.6 | 272 | 7.8 |
| Example 6 (Comparative) | | | |

TABLE 4

| Example No. | Molding resin temp. (°C.) | Mold temp (°C.) | Retention time in mold (sec) | Gear oven heat resistance test 200° C. | 230° C. | 240° C. | Deformation starting time in electronic oven range (min) | Impact strength (kg·cm/cm) 30° C. 200° C., 1 hr | unheated | −20° C. 200° C., 1 hr | unheated |
|---|---|---|---|---|---|---|---|---|---|---|---|
| 6 | 295 | 190 | 5 | O | O | O | — | 170 | — | 95 | — |
| 7 | 290 | 190 | 4 | O | O | O | 10.5 | 323 | — | 115 | — |
| 8 | 295 | 190 | 5 | O | O | Δ | 10.0 | 238 | — | 73 | — |
| 9 | 295 | 190 | 5 | O | O | O | — | 103 | — | 63 | — |
| 10 | 290 | 190 | 5 | O | O | O | — | 290 | — | 53 | — |
| Com. Example 5, 6, 7 | — | — | — | O | O | O~Δ | 9.0 | — | 115 | — | 4 |
| Com. Example 8 | 275 | 160 | 5 | X | | | 9.0 | — | — | 9 | — |

We claim:

1. A 3-methylbutene-1 polymer composition comprising:
    (a) from 10 to 85% by weight of a 3-methylbutene-1 homopolymer or a copolymer of 3-methylbutene-1 with other α-olefin having from 2 to 18 carbon atoms, which has a heat of fusion of at least 7 cal/g as measured by a differential scanning calorimeter;
    (b) from 10 to 85% by weight of a copolymer of 3-methylbutene-1 with other α-olefin having from 2 to 18 carbon atoms, which has a heat of fusion of more than 1 cal/g and less than 7 cal/g as measured by a differential scanning calorimeter; and
    (c) from 3 to 40% by weight of an elastomeric copolymer of 3-methylbutene-1 with other α-olefin having from 2 to 18 carbon atoms or an elastomeric copolymer of at least two other olefins having from 2 to 18 carbon atoms, which shows no peak in fusion as measured by a differential scanning calorimeter.

2. The composition according to claim 1, which comprises from 30 to 75% by weight of the component (a), from 15 to 50% by weight of the component (b) and from 3 to 30% by weight of the component (c).

3. The composition according to claim 1, wherein the content of 3-methylbutene-1 in the component (c) is from 30 to 50% by weight.

4. A process for preparing a 3-methylbutene-1 polymer composition, which comprises in the presence of a catalyst composed mainly of a transition metal compound and an organometallic compound of a metal of Group I to Group III of the Periodic Table,
    (a) a step of polymerizing 3-methylbutene-1, or 3-methylbutene-1 and other α-olefin having from 2 to 18 carbon atoms, to form a homopolymer or copolymer having a heat of fusion of at least 7 cal/g as measured by a differential scanning calorimeter in an amount of from 10 to 85% by weight based on the total amount of formed polymers;
    (b) a step of copolymerizing 3-methylbutene-1 with other α-olefin having from 1 to 18 carbon atoms to form a copolymer having a heat of fusion of more than, 1 cal/g and less than 7 cal/g as measured by a differential scanning calorimeter in an amount of from 10 to 85% by weight based on the total amount of formed polymers, in an optional order, and then,
    (c) polymerizing 3-methylbutene-1 with other α-olefin having from 2 to 18 carbon atoms or copolymerizing at least two other α-olefins having from 2 to 18 carbon atoms to form an elastomeric copolymer which shows no peak in fusion as measured by a differential scanning calorimeter in an amount of from 3 to 40% by weight based on the total amount of formed polymers.

5. A top-opened container made of the 3-methylbutene-1 polymer composition of claim 1.

6. The container according to claim 5, which is prepared by sheeting the 3-methylbutene-1 polymer composition and then thermoforming it.

7. The container according to claim 5, which has a wall thickness of from 100 μm to 2mm.

8. A top-opened container made of the 3-methylbutene-1 polymer composition prepared by the process of claim 4.

9. The container according to claim 5, wherein the 3-methylbutene-1 polymer composition has a melting point of from 250° to 310° C., a heat of fusion of at least 4 cal/g and a melt index of from 0.1 to 100 g/10 min.

10. The container according to claim 5, which is a heat resistant container which undergoes no heat deformation at a temperature of 160° C. and which has a dart-drop impact strength of at least 10 kg.cm/cm at −20° C.,.

11. A 3-methylbutene-1 polymer composition comprising:
    (a) from 10 to 85% by weight of a 3-methylbutene-1 homopolymer or a copolymer of 3-methylbutene-1 with other α-olefin having from 2 to 18 carbon atoms, which copolymer has a 3-methylbutene-1 content of more than 90% by weight;
    (b) from 10 to 85% by weight of a copolymer of 3-methylbutene-1 with other α-olefin having from 2 to 18 carbon atoms, which has a 3-methylbutene-1 content of from 60 to 90% by weight; and (c) from 3 to 40% by weight of a copolymer of 3-methylbutene-1 with other α-olefin having from 2 to 18 carbon atoms or a copolymer of at least two other olefins having from 2 to 18 carbon atoms, which has a 3-methylbutene-1 content of less than 60% by weight.

12. The composition according to claim 11, which comprises from 30 to 75% by weight of the component (a), from 15 to 50% by weight of the component (b) and from 3 to 30% by weight of the component (c).

13. The composition according to claim 11, wherein the content of 3-methylbutene-1 in the component (c) is from 30 to 50% by weight.

14. A process for preparing a 3-methylbutene-1 polymer composition, which comprises in the presence of a catalyst composed mainly of a transition metal compound and an organometallic compound of a metal of Group I to Group III of the Periodic Table,
   (a) a step of polymerizing 3-methylbutene-1, or 3-methylbutene-1 and other α-olefin having from 2 to 18 carbon atoms, to form a homopolymer or copolymer having a 3-methylbutene-1 content of more than 90% by weight in an amount of from 10 to 85% by weight based on the total amount of formed polymers;
   (b) a step of copolymerizing 3-methylbutene-1 with other α-olefin having from 1 to 18 carbon atoms to form a copolymer having a 3-methylbutene-1 content of from 60 to 90% by weight in an amount of from 10 to 85% by weight of based on the total amount of formed polymers, in an optional order, and then,
   (c) polymerizing 3-methylbutene-1 with other α-olefin having from 2 to 18 carbon atoms or copolymerizing at least two other α-olefins having from 2 to 18 carbon atoms to form a copolymer which has a 3-methylbutene-1 content of less than 60% by weight in an amount of from 3 to 40% by weight based on the total amount of formed polymers.

15. A top-opened container made of the 3-methylbutene-1 polymer composition of claim 11.

16. The container according to claim 15, which is prepared by sheeting the 3-methylbutene-1 polymer composition and then thermoforming it.

17. The container according to claim 15, which has a wall thickness of from 100 μm to 2 mm.

18. A top-opened container made of the 3-methylbutene-1 polymer composition prepared by the process of claim 14.

19. The container according to claim 15, wherein the 3-methylbutene-1 polymer composition has a melting point of from 250° to 310° C., a heat of fusion of at least 4 cal/g and a melt index of from 0.1 to 100 g/10 min.

20. The container according to claim 15, which is a heat resistant container which undergoes no heat deformation at a temperature of 160° C. and which has a dart-drop impact strength of at least 10 kg.cm/cm at −20° C.

* * * * *